United States Patent [19]

Ryan et al.

[11] 4,309,723

[45] Jan. 5, 1982

[54] APPARATUS AND METHOD FOR REGISTRATION AND SHADING OF COLOR TELEVISION CAMERAS

[75] Inventors: John O. Ryan, Cupertino; Joseph L. Corkery, San Carlos; Edward P. Sudyka, Santa Clara; Gerow D. Brill, Redwood City; Anne M. Reagan, Santa Clara; James R. Holzgrafe, Sunnyvale, all of Calif.

[73] Assignee: Ampex Corporation, Redwood City, Calif.

[21] Appl. No.: 140,281

[22] Filed: Apr. 14, 1980

[51] Int. Cl.³ ............................ H04N 5/14; H04N 5/22
[52] U.S. Cl. ................................................. 358/163
[58] Field of Search ................................ 358/163, 213

[56] References Cited

U.S. PATENT DOCUMENTS 3,902,011  8/1975  Pieters et al. ................. 358/163
3,919,473  11/1975  Cotter .......................... 358/163

*Primary Examiner*—Robert L. Richardson
*Attorney, Agent, or Firm*—George B. Almeida; Joel D. Talcott

[57] ABSTRACT

Precise, point-by-point correction of spatial and shading errors in a camera television picture are performed manually. The errors to be corrected are determined by visually examining a picture on a video monitor, by selecting an area for error correction which area corresponds to the type and extent of the specific error selected for correction. A position command increments or decrements an address by preselected steps to locate a movable "cursor" which, in turn, identifies the area being corrected. A correction command retrieves the data from the area identified, and which contains the error, selectively increments or decrements the data in preselected steps, and stores the new data back in memory. The process continues until the operator is satisfied with the correction results. Correction thus may be made point-by-point, along horizontal or vertical lines or areas, in selected corner areas, etc., of the picture.

19 Claims, 4 Drawing Figures

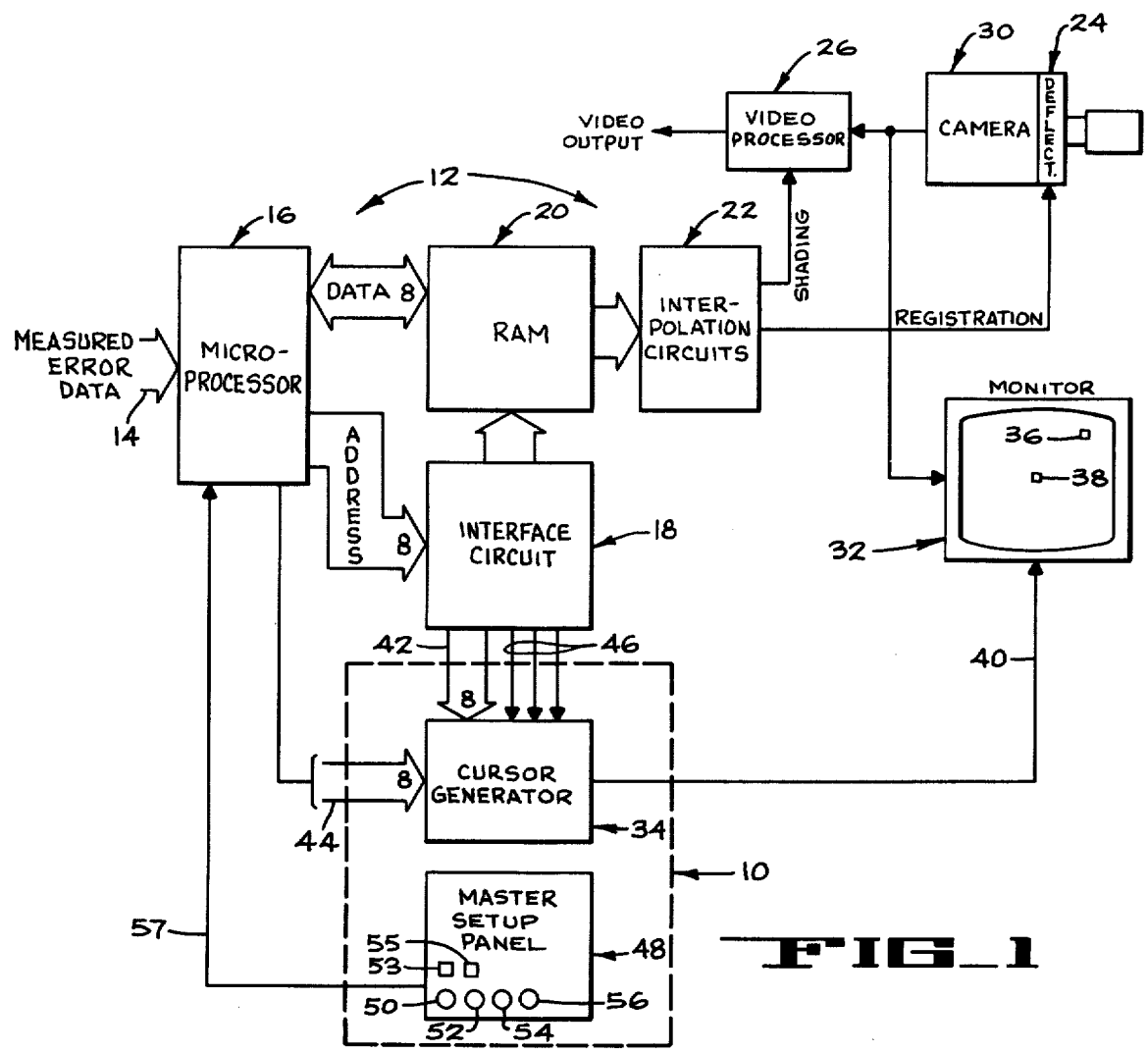
FIG_1
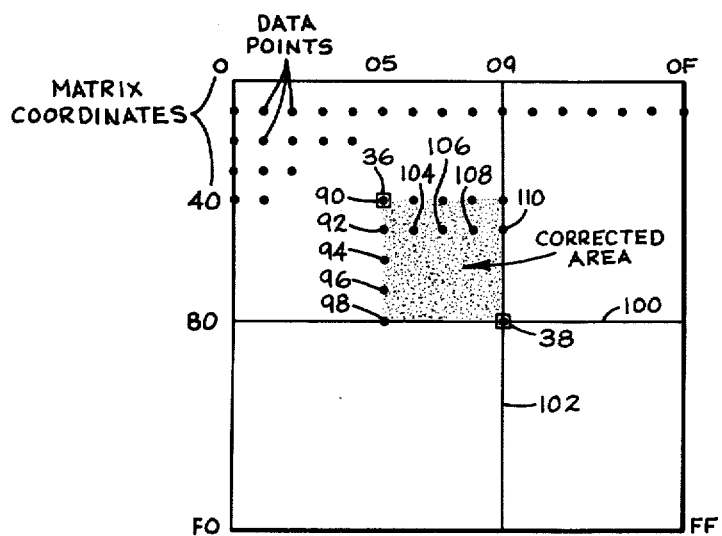
FIG_3

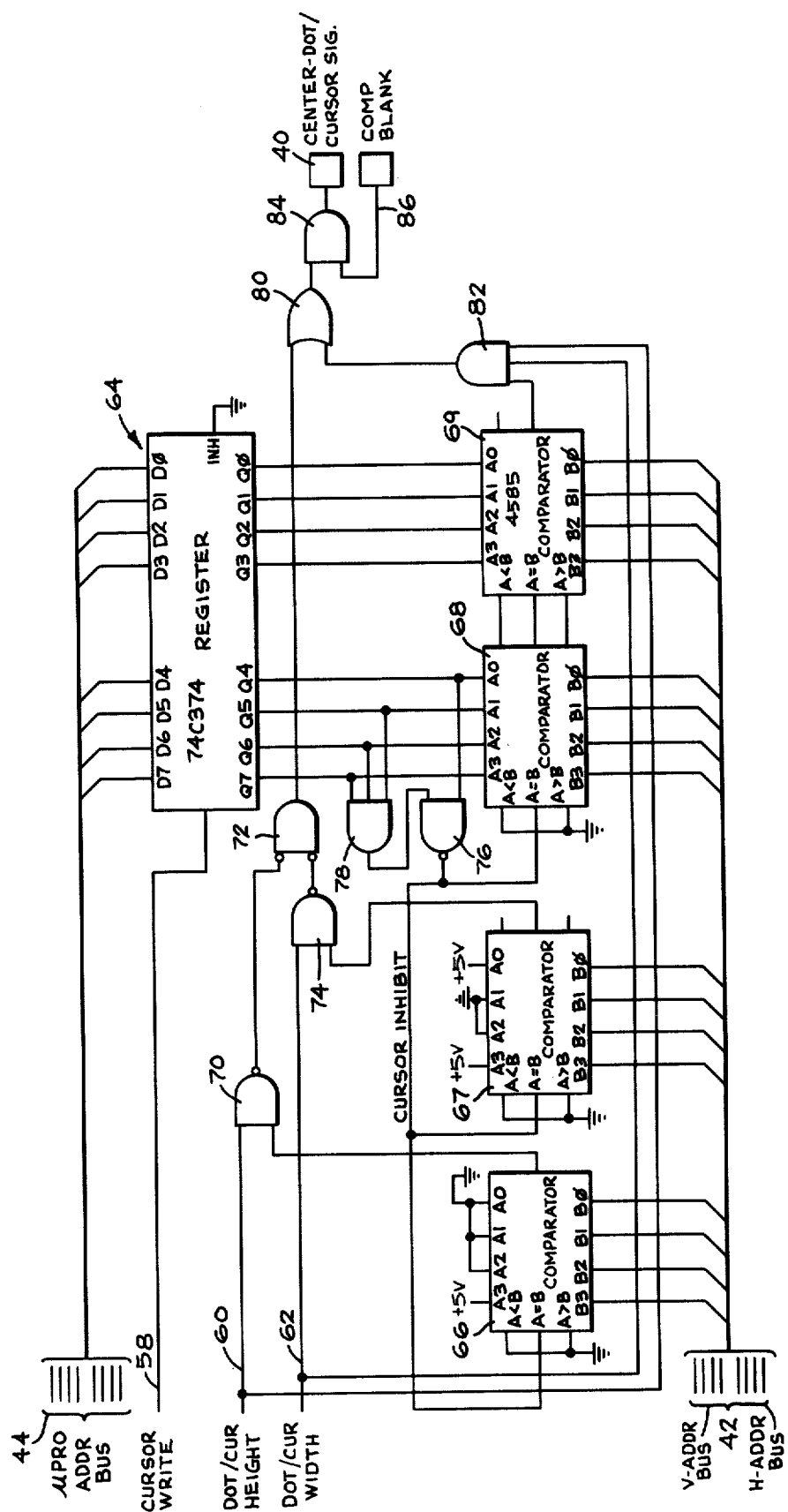
FIG_2

APPARATUS AND METHOD FOR REGISTRATION AND SHADING OF COLOR TELEVISION CAMERAS

CROSS REFERENCE TO RELATED APPLICATIONS

A Two Dimensional Interpolation Circuit for Spatial and Shading Error Correction Systems, Ser. No. 139,512, filed Apr. 11, 1980, to J. O. Ryan and J. L. Corkery.

Digital Error Measuring Circuit For Shading and Registration Errors In Television Cameras, Ser. No. 139,604, filed Apr. 11, 1980, to K. H. Griesshaber.

A Total Raster Error Correction Apparatus and Method For the Automatic Set Up of Television Cameras and the Like, Ser. No. 124,370, filed Feb. 25, 1980, to E. F. Morrison and T. E. Zank.

BACKGROUND OF THE INVENTION

The invention relates to spatial and shading error correction systems, and particularly to a manually-operated spatial and shading error measurement and correction system which performs point-by-point error correction of a video picture.

Various systems are presently known for performing spatial and shading error corrections using analog and/or digital techniques. The systems thus range from analog signal sources wherein correction is performed manually or automatically by adding various sawtooth, parabola, etc., waveforms to the basic horizontal and vertical deflection waveform, to digital schemes for precisely measuring the errors at selected sample points in a video picture, for performing an integration process on the resulting error samples, and for continually generating error correction during the camera operating mode. It follows that the various systems encompass widely-ranging degrees of complexity and different degrees of manual participation in order to perform the required error measurement and/or correction processes.

Due to the rapidly increasing application of digital techniques in the video recording field because of the inherent advantages of ease and speed in data handling and storage, compactness, low cost, etc., video cameras are being developed which employ digital techniques throughout their design. Digital techniques allow a much greater degree of compactness and thus portability in video cameras without compromising the quality of the video picture. Since digital techniques also facilitate the use of automation, various highly sophisticated and totally automated error measurement and error correction systems are being contemplated by those in the field. These latter systems, particularly in the case of the error measurement systems, incorporate off-line plug-in automatic setup units, remotely-located from the camera head unit, which provide highly accurate error detection schemes but which correspondingly add substantially to the cost of a fully automated precision error correction system.

SUMMARY OF THE INVENTION

The invention provides a digital and thus precise means for performing spatial and shading error corrections in a sophisticated camera of broadcast quality. The camera of necessity employs various digital error correction circuits such as those described in the copending application to J. O. Ryan and J. L. Corkery, cross-referenced above and thus incorporated by reference herein. The scheme is not automated, but instead employs manual manipulation while providing precise detection and correction of errors on a selectable point-by-point, and thus a given area basis, across the two dimensions of a television picture.

To this end, cursor generator means provides a movable dot, i.e., cursor, which may be moved horizontally and/or vertically in selected steps, to any position within the active area of a television picture. The generator means also provides a stationary center-dot in the picture to locate the center. Two pairs of digital tachometers are selected by switch means for use in the cursor correction system, whereby the first pair provides horizontal and vertical control of the cursor location, and the second pair provides horizontal and vertical correction of spatial and/or shading errors. The spatial and shading errors for each of the RGB tubes in the camera are selectively viewed on a monitor by an operator to detect errors in the picture when compared, for example, with an electronic test pattern (ETP) of perfect geometry. Preselected areas containing errors are visually located and the cursor is moved to the area in discrete preselected steps in response to commands from the cursor tachometers. The errors then are corrected also in discrete preselected steps by commands from the correction tachometers. Corrections thus readily are made in a preselected point-by-point, line or area basis.

BRIEF DESCRIPTION OF THE DRAWINGS

FIG. 1 is a block diagram depicting the cursor correction system within a television camera apparatus.

FIG. 2 is a schematic diagram of the cursor generating circuit of the apparatus of FIG. 1.

FIG. 3 is a plan depicting a matrix of the boxes, i.e., data points distributed across the video picture wherein an area selected for correction is depicted between cursor and center-dot.

DESCRIPTIONS OF THE PREFERRED EMBODIMENTS

Figure 4:
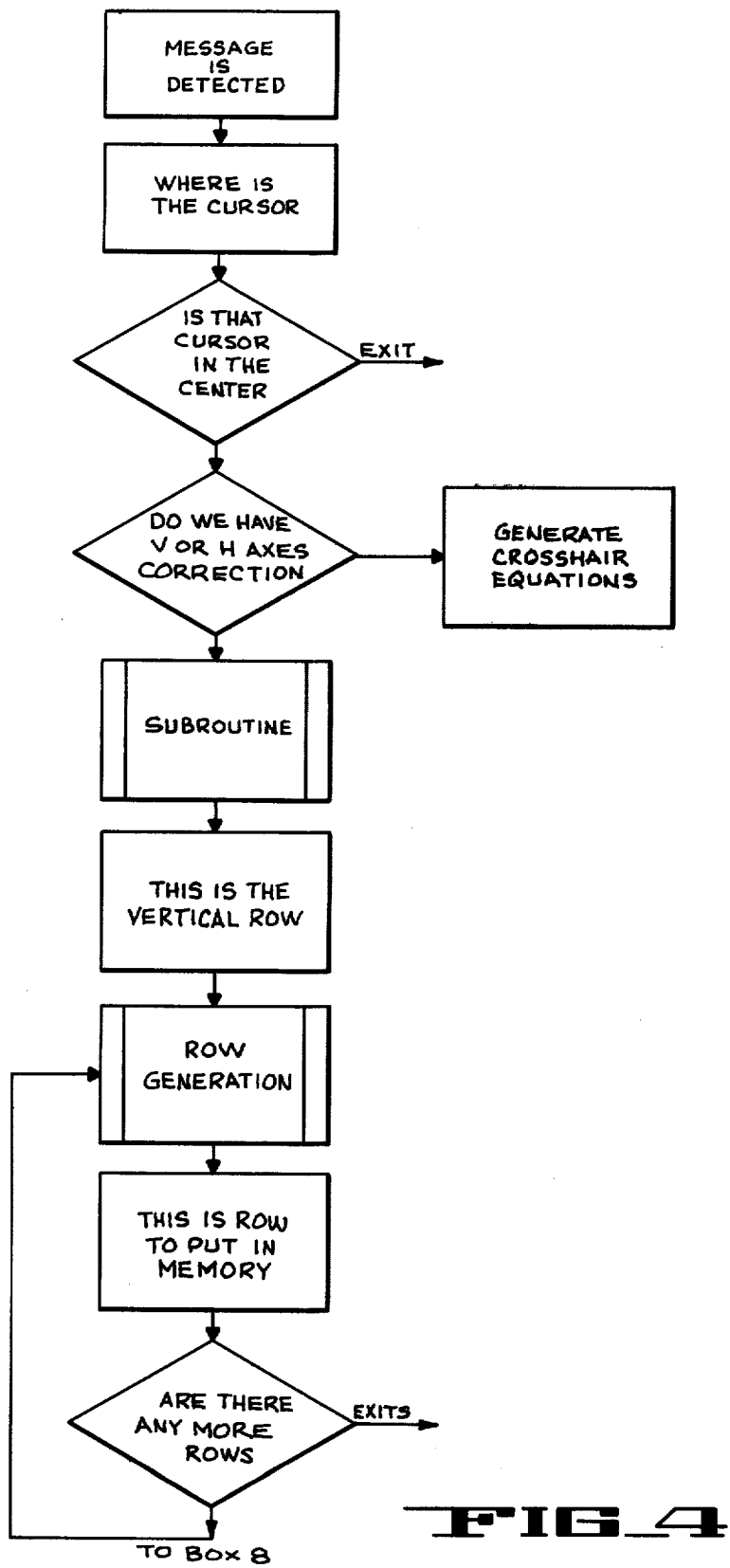
FIG. 4 is a flow chart depicting the process for determining the correction values.

FIG. 1 depicts a cursor correction system 10 and its relationship to a digital spatial and shading error correction (SEC) system 12, viz, the interpolation system described, for example, in the above cross-referenced copending application to J. O. Ryan and J. L. Corkery. Such an interpolation system provides the digital circuits required to receive measured error data via a data bus 14, and to generate therefrom horizontal and vertical spatial error correction signals, and black and white shading correction signals. The data used to generate the correction signals originates during a camera setup mode, in an error measurement system of a type, for example, which employs a selected array of sample points, boxes, etc., generally evenly distributed, horizontally and vertically across the video image of a television camera tube. By way of example, as exemplified herein and in the cross-referenced J. O. Ryan et al application, the measured error data originates from a 16 by 16 evenly distributed array of "correction" points (13 by 14 of which are in the active video picture). The measured error data is selectively stored via à microprocessor control 16 and an associated interface circuit 18, within a random access memory (RAM) 20 in the interpolation system 12 in the form of, for example 8-bit words. The correction data thus is readily available to the camera head unit during the operating mode of the camera in an addressable, point-by-point correction basis.

During camera set up, the stored data is addressed and retrieved by the microprocessor 16 and the interface circuit 18, and is smoothed by performing horizontal and vertical interpolation between the correction points via interpolation circuits 22. The resulting analog signals are supplied as error correction waveforms, via respective output lines, to conventional pickup tube deflection circuits 24 to correct errors in horizontal and vertical registration, and to a conventional video processing circuit 26 to correct errors in black and white shading. The video signal from the camera 30 is fed also to a television monitor 32 in which the errors are viewed.

An example of an error measurement system which supplies measured error data in an array format analogous to that used by the error correction/interpolation system 12, is described in the above cross-referenced, copending application to K. H. Griesshaber, which is incorporated herein by way of reference.

The cursor correction system 10 further includes a cursor generator 34 which generates cursor and center-dot signals on a line 40 extending to the television monitor 32. The corresponding movable cursor and the stationary center-dot, depicted by numerals 36, 38, respectively, are displayed in the video picture generated by the camera 30, and displayed on the television monitor 32. The cursor generator 34 provides the cursor and dot images in the form of a small square dot wherein, however, other convenient geometrical configurations may be generated as desired. The center-dot 38 is defined by its corresponding address location (e.g., digital coordinates 89 of FIG. 3) which is not the exact center of the picture. Thus the center-dot 38 further defines a center vertical axis and a center horizontal axis across the face of the picture. The center axes divide the picture generally into four quadrants extending outward from the center-dot 38. Thus the center-dot and the center axes define reference points for locating areas, lines, etc., extending therefrom.

The address defining the raster scan, i.e., the horizontal and vertical sync addresses, are generated by the interface circuit 18 via an H/V sync cursor address bus 42, and particularly, by a timing circuit in the interface utilizing the usual system horizontal and vertical timing signals as described in the copending J. O. Ryan et al application. The cursor address locations are generated by the microprocessor 16 on a cursor address bus 44. The center-dot address is hardwired and located about the center of the picture. The cursor 36 address is incremented or decremented to move it in any horizontal or vertical direction in the picture, in steps of one preselected unit, or steps in the address location. Various clock and control signals are fed to the cursor generator 34 from the interface circuit 18, via control lines 46.

A master setup panel (MSP) 48 is included in the cursor correction system 10, and provides means for interfacing the input from the operator to the system. The MSP is employed for other purposes in the operation of the camera apparatus, depending upon the needs of the operator. Likewise, first and second pairs of digital tachometers 50, 52 and 54, 56 respectively, are activated via registration or shading switch buttons 53, 55, respectively, for different functions depending on the function requested. Thus, upon initiating a cursor request, the tachs 50–56 become active for the cursor generating and manipulating functions used in the error correction process, as further described below.

In FIG. 2, the microprocessor address bus 44 and the vertical and horizontal (raster) address bus 42 are fed to the cursor generator 34. The latter thus is under control of the microprocessor 16. In addition, control lines 46 provide cursor write, dot/cursor height, and dot/cursor width clock signals on lines 58, 60 and 62 respectively, from the interface circuit 18.

The address bus 44 is coupled to the inputs of a register 64 which holds the cursor location, while the horizontal and vertical address bus 42 is coupled to two pairs of comparators 66, 67 and 68, 69. The cursor write signal on line 58 is fed to the clock input in the register 64. The dot/cursor height signal on the line 60 is fed to one side of a NAND gate 70, whose other side is coupled to the output of the comparator 66, and whose output feeds one input of an AND gate 72. The dot/cursor width signal on line 62 is fed to a NAND gate 74, and thence to the other side of AND gate 72. NAND gate 74 is also coupled to the output of the comparator 67. A cursor inhibit signal is generated via a NAND gate 76 and applied to a A=B port of the comparator pair 66, 67 and if the comparator 68, and when low inhibits the generation of a dot or cursor. Thus, one input of NAND gate 76 is coupled to the 4th bit line of the register output, and the other input is coupled to the 5th through 7th bit lines via an AND gate 78.

NAND gate 72 couples to an OR gate 80, whose other input is coupled to the output of the comparator 69 and also to lines 60, 62, via an AND gate 82. The output of OR gate 80 corresponds to either or both of the signals which generate the center-dot 38 and the cursor 36. OR gate couples to an AND gate 84, which also is coupled to a system composite blanking signal on a line 86.

In operation, the cursor register 64 contains the 8-bit address location of the cursor, which is written therein by the microprocessor 16 via the bus 44. At such time as it is desirable to move the cursor to a new location, the cursor select signal goes high (via the microprocessor 16) and the address bus 44 loads the new desired location into the register 64. The register feeds the address to the comparators 68, 69.

The sync address bus 42 loads the address location of the raster scan into the pairs of comparators 66, 67 and 68, 69, which comprise the center-dot and the cursor comparators, respectively. The cursor comparators 68, 69 compare the cursor address location to the raster address location and, when the two agree, outputs the cursor generating signal to the AND gate 82 via the output of the comparator 69. The gate 72 also is gated with the dot/cursor height and the dot/cursor width signals on lines 60, 62, respectively, which limits the size of the cursor image on the monitor 32 to, for example, four television lines, and the width to 0.5 microseconds ($\mu s$). The cursor signal is passed via the gate 80 and appears on the monitor picture at the address location as the cursor 36.

The raster address is also fed to the center-dot comparators 66, 67, which compares it to a hardwired (i.e., stationary) address located generally around the center of the picture. For example, the center-dot address location is a binary representation of 89 in FIG. 3, which is not the center of the active picture as depicted. When the raster address location agrees with the stationary address, the comparators 66, 67 provide positive outputs corresponding to the center-dot signal, to respective gates 70, 74.

The gates are also gated with the dot/cursor height and width signals on lines 60, 62, wherein the combination generates a center-dot 38 of a size corresponding to that of the cursor 36. The center-dot signal is also applied via the OR gate 80 to generate an image in the picture.

The final gate 84 inhibits the center-dot or the cursor signals during the blanking intervals in response to a system composite blanking signal on a line 86.

Regarding the MSP 48 of FIG. 1, the digital tachometers 50–56 are activated for use as cursor correction system controls by energizing either SEC-registration, or SEC-shading buttons 53, 55 on the MSP 48. If either button is pushed, the tachs 50 and 52 are activated as horizontal and vertical cursor location controls respectively. If the SEC-registration button is pushed, the tachs 54 and 56 also are activated as horizontal and vertical registration correction controls respectively. If the SEC-shading button is pushed, the tachs 54 and 56 also are activated as black shading and white shading correction controls respectively.

The tachs include conventional circuitry such as a PROM which, when the tachs are rotated, generate serial messages which are encoded onto an instruction line 57 to the microprocessor. The serial messages are in instruction format and carry the usual information, eg, identify the source of message as the MSP 48, the destination of message as a specific camera, how many bytes are contained in the instruction package, end of message information, etc.

By way of example, assume an operator wishes to correct registration errors in the picture, at a certain point or area. The digital tachs are activated via the SEC-registration button to allow use of the cursor correction system in conjunction with the SEC 12. The tachs 50 and 52 are selectively rotated to move the cursor 36 horizontally and vertically as desired. Immediately upon rotation, the tachs issue respective instructions to the microprocessor 16 which say in effect to step the address location and thus the cursor 36 location, one step horizontally left or right and/or vertically up or down depending upon the direction of rotation of the tachs. The microprocessor sends the new cursor address location to the register 64 via the cursor address bus 44. The cursor generator 34 immediately compares the desired new address location of the cursor with the scan raster address location via the register 64 and comparators 68, 69, and when they agree generates the cursor in the picture at the desired point.

Having located the cursor 36 at the point where correction is desired, the operator then applies, for example, a horizontal correction via the horizontal registration tach 54. The instructions to the microprocessor 16 now request an increment or decrement in the data stored at the address location identified by the cursor address location. The data at that point, or area of points, are read from the RAM 20, are incremented or decremented by a selected unit and are stored back in the RAM at the same address location. If the operator is not satisfied with the correction, the process is repeated.

Various relationships are employed to perform the cursor positioning function and/or the error correction function, i.e., to determine the steps taken by the cursor and also the units used to correct the data. Such relationships allow the microprocessor 16 to correct errors, in response to the correction instructions from the MSP, not only along an entire line, but also over an area of points (generally rectangular) extending from the cursor location to the center-dot. Since registration errors, and also shading errors, characteristically are greater around the outer portions of the picture, particularly in the corners, and less at the center, a means for applying a graduated scale of correction units to the corresponding data points is required if correction is to be applied, for example, over a quadrant, or a portion of a quadrant. Registration errors characteristically also occur along horizontal rows and vertical columns of the picture, and accordingly, a relationship for correcting along a horizontal or vertical line is also preferred.

To this end, various relationships are contemplated herein which allow the cursor correction system to perform more than single data point corrections, i.e., registration and shading corrections over the entire lengths of horizontal or vertical lines, and over areas extending from a corner to the center-dot in the picture. To this end, first regarding corrections to data over an area of data points, the area is found by the equations:

$$\text{hor. distance from center} = \text{1 hor. cursor position} - \text{hor. center 1} + 1 \quad (1)$$

$$(1 \text{ vert. distance from center} = \text{1 vert. cursor position} - \text{vert. center 1} \div 10) + 1 \quad (2)$$

The equations for determining the graded scale of correction to be applied to the area determined by the above equations (1) and (2), starting at the maximum vertical and maximum horizontal distance from the center-dot, and extending to the center-dot, are as follows:1

$$\frac{(x - y)}{2} + y = \text{correction at box} \quad (3)$$

Where x=maximum correction, y=minimum correction, and a box corresponds to the immediate area about a data point. The box corresponds, for example, to the correction points referred to in FIG. 2 of the copending J. O. Ryan et al application. Also, the minimum box always is given a correction of zero units.

The equation for determining which box along a line of boxes is being corrected is:

$$\frac{(bx - by)}{2} + by = \text{box to be corrected} \quad (4)$$

Where bx=box of maximum correction and by=box of minimum correction.

Given an area over which corrections are to be made, the above equations are applied to determine first, the area in terms of boxes (and thus related data point address locations whose respective data is to be corrected) and next, the graded scale of correction units to be applied, beginning with a maximum number of units (bits in this instance) at the furthest box, and grading down to zero bits at the center-dot.

The maximum number of bits used herein, by way of example only, is four. However, six, eight, etc., may be used depending upon the sensitivity of the correction desired.

The correction equations (3) and (4) are applied first in the vertical direction, along the furthest vertical column of boxes, and then to the furthest horizontal row of boxes. The process is repeated for all the remaining boxes in the horizontal rows, until all boxes are assigned a correction value, as depicted below.

There follows an example of, first, determining the area over which correction is applied and, second, the graded array correction bits to be applied to the data at the data points corresponding to the boxes within the area. Referring to FIG. 3, the shaded area represents the area over which the operator wishes to make corrections for registration errors. the cursor 36 is moved to the furthest point (i.e., 45 of the matrix) via the MSP controls and the cursor generator 34 in response to the microprocessor 16.

Cursor area:
Using equations (1), (2) and FIG. 3:
hor. distance = $|5-9|+1=5$ boxes ver. distance = $(|40-80|\div 10)+1=5$ boxes

TABLE I

| Correction for farthest vertical row: equation (3): | | | boxes | | |
|---|---|---|---|---|---|
| (1) 5 boxes (eg, data points) | | | | | |
| 4 bits max correction | 5 | 4 | 3 | 2 | 1 |
| 0 bits min correction | 4 | | | | 0 |
| (2) box to be corrected (in center) equation (4) | | | | | |
| $\frac{5-1}{2}+1=3$ | | | | | |
| correction for box 3, equation(3) | | | | | |
| $\frac{4-0}{2}+0=2$ | 4 | | 2 | | 0 |
| (3) next box to be corrected, equation(4) | | | | | |
| $\frac{5-3}{2}+3=4$ | | | | | |
| correction for box 4, equation(3) | | | | | |
| $\frac{4-2}{2}+2=3$ | 4 | 3 | 2 | | 0 |
| (4) last box to be corrected, equation(4) | | | | | |
| $\frac{3-1}{2}+1=2$ | | | | | |
| correction for box 2, equation(3) | | | | | |
| $\frac{2-0}{2}+0=1$ | 4 | 3 | 2 | 1 | 0 |

Thus the graded values which are applied via the cursor correction system at each of the data points 90, 92, 94, 96 and 98 along the furthest vertical column, are 4, 3, 2, 1 and 0 respectively. As previously mentioned, zero bit correction is always applied in the closest box, e.g., box 98. The horizontal and vertical center axes 100, 102 are considered "centers" and are assigned zero bit correction.

Next, the first horizontal row of corrections are determined, via equations (3), (4). However, in this example the first horizontal row has the same values as the first vertical row because it has the same maximum correction and box numbers; 4, 3, 2, 1 and 0.

Next, correction values for the second horizontal row are determined, via equations (3), (4),

TABLE 2

| Second horizontal row: | | | Boxes | | |
|---|---|---|---|---|---|
| (1) 5 boxes | | | | | |
| 3 bits max correction (obtained for point 92 in first vertical column) | | | | | |
| 0 bits min correction | | | | | |
| | 5 | 4 | 3 | 2 | 1 |
| (2) box to be corrected, equation(4) | | | | | |
| $\frac{(5-1)}{2}+1=3$ | 3 | | | | 0 |
| correction for box 3, equation(3) | | | | | |
| $\frac{3-0}{2}+0=1$ | 3 | | 1 | | 0 |

TABLE 2-continued

| Second horizontal row: | | | Boxes | | |
|---|---|---|---|---|---|
| (3) box to be corrected, equation(4) | | | | | |
| $\frac{5-3}{2}+3=4$ | | | | | |
| correction for box 4, equation(3) | | | | | |
| $\frac{3-1}{2}+1=2$ | 3 | 2 | 1 | | 0 |
| (4) box to be corrected, equation(4) | | | | | |
| $\frac{3-1}{2}+1=2$ | | | | | |
| correction for box 2, equation(3) | | | | | |
| $\frac{1-0}{2}+0=0$ | 3 | 2 | 1 | 0 | 0 |

Thus the second horizontal row of points 92, 104, 106, 108 and 110 are given correction values 3, 2, 1, 0 and 0 respectively.

Continuing through the shaded area via the next three horizontal rows provides the final graded distribution of error correction data for the shaded area of FIG. 3, wherein the cursor 36 address location corresponds to the extreme distance of the area from the center-dot 38, and thus the horizontal and vertical center axes therefrom.

Thus as previously described, given registration errors in the shaded area, the cursor 36 is manipulated via operator input to locate it at the furthest address location (of a corresponding data point) via the MSP 48 tachometers 50, 52. The graded correction distribution determined above is applied to the data points (i.e., the boxes) automatically via the cursor correction system by rotating the tachs 54, 56 to provide, in this example, horizontal and vertical spatial error correction. As each data point within the area to be corrected is addressed, the data are read out, the correction bits are added or subtracted as determined by the rotation of the respective tach on the MSP 48, and the data are stored back at its address location.

Corrections are made to an entire vertical or horizontal line by moving the cursor 36 to a position along the vertical or horizontal center axis 102, 100. When the cursor 36 is on an axis, the MSP 48 sends instructions to the microprocessor 16 whereby, upon rotation of the correction tachs 54, 56, correction is provided along the entire line which crosses the axis at the location of the cursor 36. That is, the data from the data points along the entire line are sequentially read from memory, a minimum unit of two bits are added or subtracted to the data at each location, and the data is returned to the RAM 20 at the same address location. Upon correcting a line, the cursor 36 may be moved in towards the center-dot by a data point, and correction again may be applied. Thus a large area of the picture may be variously corrected by moving the cursor in along a center axis while generating correction along the entire length of each line of data points.

Shading errors are also corrected by determining a graded correction distribution over a selected area, wherein the errors in black or white shading characteristically are greater along the outer edges of the television picture. Thus, the cursor area is determined as before, using the same relationship, and correction is applied, generally via placing the cursor 36 on a center axis and performing corrections sequentially along successive entire lines of data points employing the black shading, and white shading tachs 54, 56 respectively. Black and white shading is respresented as a voltage level, and accordingly, the rows of data points are addressed in response to the cursor 36 address location, the data is read from the RAM 20, correction of the voltage levels is made by one unit, and the data is written back into memory.

FIG. 4 depicts, by way of example, a flow chart of the process of determining the correction used and the graded array of correction values as previously discussed with the equations. The chart is generally self explanatory, and begins with block 1, which is the message from the MSP 48 to the microprocessor on line 57. If the message indicates a correction via the cursor system, the flow proceeds to "where is the cursor" and the cursor location is determined by the first set of equations above. Next a decision is made by "is that cursor in the center". If the cursor is, the procedure exits. If not, another decision is made in block four, "do we have vertical or horizontal axes correction". If yes, the procedure goes out to the "generates cross-hair equations", i.e., the center axes type of correction where the cursor is moved to either the vertical or horizontal center axes, and a two bit correction is applied to each data point along an entire line.

If the decision in block four concerns an area type of correction, the subroutine of block six is entered. The procedure then determines the area and then the correction values as per the equations (1) through (4) of previous mention. The values are stored for the furthest vertical row of data points 90-98, which are held in the microprocessor 16 and the horizontal rows are then determined as previously described, one row at a time. Each horizontal row of correction values is stored in the RAM. The cycle through the horizontal rows is shown by blocks eight, nine and ten. When the last row is determined as when the system detects a zero correction for the maximum correction, the procedure exits and the entire array of graded correction values is stored in the RAM 20.

What is claimed is:

1. A system for correcting spatial and shading errors occurring in a television picture, wherein the errors are stored in memory data point address locations, comprising the combination of;
    means including a monitor for visually selecting and electronically locating the extent of the data points to be corrected;
    means for determining the correction values to be made to the data commensurate with the selected area;
    means for retrieving the data from memory in response to the means for determining;
    means for decrementing or incrementing the retrieved data by a given unit in response to the means for determining the correction; and
    means for loading the corrected data back into memory at the same data point address location.

2. A system for correcting spatial and shading errors occuring in a television picture, wherein the errors are stored in memory data point address locations, comprising the the combination of;
    means for selecting the extent of the data points to be corrected;
    said means for selecting including, cursor generating means responsive to a system sync address for generating a movable cursor address location definitive of the extent of the data points being corrected;
    means for determining the correction values to be made to the data;
    means for retrieving the data from memory in response to the means for determining;
    means for decrementing or incrementing the retrieved data by a given unit in response to the means for determining the correction; and
    means for loading the corrected data back into memory at the same data point address location.

3. The system of claim 2 wherein the cursor generating means further include;
    means for generating a stationary center-dot address location generally about the center of the picture; and
    wherein the movable cursor address location defines the extent of data points relative to the center-dot address location.

4. The system of claim 3 wherein the picture errors and thus extent of data points extend over a given area of the picture;
    said movable cursor address location being commensurate with the area of the picture; and
    said means for determining the correction being responsive to the distance of the cursor address location from the center-dot address location.

5. The system of claim 4 including; instruction means for generating messages indicative of cursor position control, and of data point correction control.

6. The system of claim 5 wherein the movable cursor address location defines a quadrant area of the picture; and
    the determined correction values are graded from a selected maximum at the cursor address location to a zero value at the stationary center-dot address location.

7. The system of claim 6 wherein the memory is integral with a microprocessor, and wherein the system includes;
    said microprocessor being responsive to the message generating means to increment or decrement the movable cursor address location in given units to identify the quadrant area by the relations;

hor. distance from center =
|hor. cursor position − hor. center| 1 + 1 and
vert. distance from center =
(|1 vert. cursor position − vert. center| ÷ 10) + 1.

8. The system of claim 7 wherein the graded scale of correction is defined by the equations;

$$\frac{(x-y)}{2} + y = \text{correction at data point within a box}$$

$$\frac{(bx-by)}{2} + by = \text{box to be corrected}$$

wherein x and y equal the maximum and minimum correction values respectively, and bx and by equal the boxes of maximum and minimum correction respectively.

9. The system of claim 3 wherein;
    the movable cursor address location defines a vertical or horizontal line of data points extending across the picture.

10. The system of claim 9 wherein the means for determining the correction values applies at least one unit of correction to each data point along the line located by the movable cursor address location.

11. The system of claim 10 further including;

horizontal and vertical center axes passing through the center-dot;

said movable cursor address location corresponding to a point along an axis; and said determined correction values of a least one unit of correction extend for the entire line of data.

12. The system of claim 4 or 11 wherein the error in the picture is black or white shading; and the determined correction values added or subtracted to the data points represent voltage levels.

13. The system of claim 3 wherein the movable cursor address location defines successive single data points in the picture relative to the stationary center-dot address location.

14. Method for correcting spatial and shading errors in a television picture, wherein the errors are digitally stored in memory data point address locations, comprising the steps of;

visually selecting an area of the picture which contains errors commensurate with the stored errors;

locating the area in the picture relative to a given fixed reference point;

retrieving the data of the located area from its corresponding data point address locations;

changing the value of the data commensurate with the characteristics of the selected area relative to the given fixed reference point; and loading the new data back into the memory at the same address locations.

15. The method of claim 14 wherein the step of locating an area includes;

generating a stationary center-dot address location commensurate with the general center of the picture; and generating a movable cursor address location commensurate with the extent of the area from the center-dot address location.

16. The method of claim 15 wherein;

the step of locating further includes providing instructions for initiating the generation of the center-dot and cursor address locations, and the step of changing includes grading the value of the changes made to the data from maximum of the furthest distance to zero at the center-dot.

17. The method of claim 15 wherein the step of generating a movable cursor address location includes generating at least one address location corresponding to a data point.

18. The method of claim 17 wherein the step of locating further includes;

generating stationary address locations corresponding to vertical and horizontal axes of the picture; and generating movable cursor address locations along the vertical and horizontal axes to define respective horizontal and vertical lines of correction extending across the picture.

19. The method of claim 18 wherein the step of changing includes;

adding or subtracting at least one unit of voltage of the data along the horizontal or vertical lines located by the movable cursor address location.

* * * * *